(12) United States Patent
Kim

(10) Patent No.: US 6,201,838 B1
(45) Date of Patent: Mar. 13, 2001

(54) MOBILE COMMUNICATION SYSTEM

(75) Inventor: Dae Sik Kim, Cheongju (KR)

(73) Assignee: LG Semicon Co., Ltd., Chungcheonbuk-Do (KR)

( * ) Notice: Subject to any disclaimer, the term of this patent is extended or adjusted under 35 U.S.C. 154(b) by 0 days.

(21) Appl. No.: 09/038,233

(22) Filed: Mar. 11, 1998

(30) Foreign Application Priority Data

Mar. 12, 1997 (KR) .................................................. 97-8222

(51) Int. Cl.[7] .............................. H04L 27/06; G06F 12/06
(52) U.S. Cl. ........................ 375/341; 375/316; 714/743; 714/744; 714/795; 345/317; 365/230.01; 365/230.06
(58) Field of Search ..................................... 375/262, 265, 375/316, 324, 340, 341; 714/711, 743, 744, 768, 791, 792, 794, 795; 345/316, 317; 365/230.01, 230.06

(56) References Cited

U.S. PATENT DOCUMENTS

| | | | |
|---|---|---|---|
| 5,051,998 | * 9/1991 | Murai et al. | 714/762 |
| 5,060,221 | * 10/1991 | Sako et al. | 369/59 |
| 5,241,563 | * 8/1993 | Paik et al. | 375/200 |
| 5,384,782 | * 1/1995 | Elms | 714/701 |
| 5,430,684 | * 7/1995 | Kim et al. | 365/230.01 |
| 5,535,220 | * 7/1996 | Kanno et al. | 714/701 |
| 5,640,670 | 6/1997 | Samueli et al. | 455/3.2 |
| 5,706,480 | * 1/1998 | Kim | 345/517 |
| 5,933,159 | * 8/1999 | Choi | 345/517 |

* cited by examiner

Primary Examiner—Young T. Tse
(74) Attorney, Agent, or Firm—Morgan, Lewis & Bockius LLP

(57) ABSTRACT

A mobile communication system includes a demodulator demodulating an interleaved data signal and outputting a demodulated data. A deinterleaver data array receives and deinterleaves the demodulated interleaved data and outputs a deinterleaved demodulated data. A memory stores the deinterleaved demodulated data and a Viterbi decoder receives the deinterleaved demodulated data from the memory. The Viterbi decoder corrects any error in the deinterleaved demodulated data. A controller accesses unit data outputted from the demodulator to the deinterleaver data array and the memory, respectively. An address generator receives an externally applied start address signal and outputs address signals corresponding to a block size to the deinterleaver data array. An input/output unit is coupled to the demodulator, the deinterleaver data array, and the controller. The input/output unit controls data input/output operations.

25 Claims, 5 Drawing Sheets

MOBILE COMMUNICATION SYSTEM

This application claims the benefit of Korean Application Number 8222/1997 filed on Mar. 12, 1997, which is hereby incorporated by reference.

BACKGROUND OF THE INVENTION

1. Field of the Invention

The present invention relates to a mobile telephone system, and more particularly, to a mobile communication system having high throughput rate and a mass data process capability.

2. Description of the Related Art

FIG. 1 illustrates a conventional digital video signal processing circuit. The circuit includes an RBA (random block access) controller 30 for controlling an RBA operation mode which enables bit unit (16×16 bits) data access using externally adapted signals /RAS (Row Address Strobe), /CAS (Column Address Strobe), /WE (Write Enable), /DT (Data Transmission), /SC (Serial Clock), /RBA. An address signal generator 10 generates internal address signals using an externally applied start address signal (ROW/COLUMN ADDRESS) in accordance with a control of the RBA controller 30. A memory cell array 40 stores data in accordance with a control of the RBA controller 30 through the address signal generator 10. A transmission control unit 20 controls data transmission of the memory cell array 40 in accordance with a control of the RBA controller 30 and the address signal generator 10. An input/output unit 50 carries out data input/output in accordance with a control of the RBA controller 30 and the transmission control unit 20.

The address signal generator 10 includes a row address signal generator 11 for generating a row address signal in response to the externally applied start address signal in accordance with a control signal outputted from the RBA controller 30 and a column address signal generator 12 for generating a column address signal. Here, for accessing data in bursts, the start address is applied externally from the CPU, while an address to be accessed at a later time is generated internally.

The transmission control unit 20 includes an RBA selector 21 for outputting a selection signal SELn which serves to store or read data to or from the memory cell array 40. A serial register 22 converts applied data to a parallel format and outputs the resultant data. An RBA-Y decoder 23 outputs a Y-address signal so as to control the serial register 22 using the column address signal applied thereto in accordance with the control signal outputted from the RBA controller 30.

The input/output unit 50 includes an input/output block 51 for inputting or outputting data in accordance with the control signal, and an input/output controller 52 for controlling the input/output block 51 in accordance with the control signal outputted from the RBA controller 30.

FIG. 2 illustrates a detailed block diagram of the RBA controller 30 in the circuit of FIG. 1. The controller 30 includes a mode selector 34 for determining whether to operate under a present operation mode or a new mode with regard to a semiconductor chip operation mode, by checking an externally applied control signal. An X-state pointer 31 (0 . 7 rows) counts a displacement value of a "row address" signal currently being accessed in a way in which the displacement value is increased by one per cycle of an externally applied serial clock SCx in accordance with a selection of the mode selector 34. A Y-state pointer 32 (0–31 column) counts a displacement value of a column address signal currently being accessed in a way in which the displacement value is increased by one per cycle of the externally applied serial clock SCx in accordance with a selection of the mode selector 34. An internal control signal generator 33 receives the counted value of the X-state and Y-state pointers 31, 32 and externally applies signals /RAS, /CAS, and generates internal control signals /RASi, /CASi, transmission signal (XF), register enable signal (RGE), serial decoder enable signal (SDE) so as to control respective portions in a semiconductor chip. An internal clock signal generator 35 generates an internally required system clock signal SYCK in accordance with the externally applied serial clock signal SCx.

The conventional digital video processing circuit will now be described in more detail.

For the purpose of performing data compression and restoration in such a digital video signal processing circuit, there is prescribed a basic 16×16 bits of data processing block size for carrying out a block unit random read and a block unit serial write. The block size of 16×16 bits serves to carry out a successive data read/write operation.

Beginning with an externally applied start address signal ROW/COLUMN ADDRESS, the address signal generation unit 10 generates an address signal which is to be accessed for data processing. At this time, the X-state pointer 31 in the RBA controller 30 continues counting from zero to fifteen a displacement value of a row address signal presently being accessed thereto following a start row address signal where an externally applied serial clock signal SCx is increased by one every 16 cycles. The Y-state pointer 32 in the RBA controller 30 continues counting from zero to fifteen a displacement value of a column address signal presently being accessed thereto following a start column address signal where an externally applied serial clock signal SCx is increased by one per cycle.

The counted output values XRn, YRn, of the X-state and Y-state pointers 31, 32 are respectively applied to the internal control signal generator 33 and to the mode selector 34.

Then, the internal control signal generator 33 receives the output values XRn, YRn from the respective X-state and Y-state pointers 31, 32, an externally applied row address strobe signal /RASx, and an externally applied column address strobe signal /CASx. The internal control signal generator 33 generates an internal row address strobe signal /RASi, an internal column address strobe signal /CASi, a transmission signal XF, a register enable signal RGE, and a serial decoder enable signal SDE so as to respectively control portions in the address signal generator 10 and the transmission control unit 20.

The mode selector 34 serves to determine whether a semiconductor chip operation mode is to follow a present mode or a new mode by checking an externally applied control signal for every 16×16 bits (256 cycles) with regard to the externally applied serial clock signal SCx. In the serial block write mode of the RBA mode, data is written in units of 16×16 blocks. Thus, if the initial start write address is given as (0,0) when the first block is written, the start address of the second block is given as an address value that is a multiple of 16 which does not overlap with that of the first block. For example, (16,0) is given to the second block. Thus, an address that is 16 greater than the address of the previous block is given to a new block that is to be written.

Likewise, the address signal generator 11 which receives an internal row address strobe signal /RASi from the internal control signal generator 33 in the RBA controller 30, generates an internal row address signal to the memory cell array 40 using the start row address signal ROW ADDRESS. The column address signal generator 12 outputs an internal column address to the RBA selector 21 and the RBA-Y decoder 23, respectively, in the transmission control unit 20, using the control signal outputted from the RBA controller 30 and an externally applied start column address signal COLUMN ADDRESS.

At this time, RBA-Y decoder 23 receives the decoder enable signal SDE outputted from the RBA controller 30, and the column address signal outputted from the column address generator 12, and outputs the received signals to the RBA selector 21 and the serial register 22, whereby the RBA selector 21 outputs a Y-address signal outputted from the RBA-Y decoder 23.

Accordingly, the memory cell array 40 receives a row address signal from the row address generator 11, and a column address signal from the RBA selector 21. When the RBA selector 21 outputs a selection signal SELn for writing data in the memory cell array 40 or reading data from the memory cell array 40, a block is designated in the memory cell array 40 in accordance with the row and column address signals. When a block is designated in the memory cell array 40, data is written to the block or read from the block.

The serial register 22 receives data sequentially from the memory cell array 40 or the input/output unit 50 in accordance with the control signals outputted from the RBA controller 30, the RBA-Y decoder 23, or the RBA selector 21, and the sequentially applied data is outputted in parallel to the memory cell array 40 or the input output unit 50. The input/output controller 52 in the input/output unit 50 controls the input/output block 51 in accordance with a signal outputted from the RBA controller 30. Then, the input/output block 51 receives data applied thereto in accordance with a control of the input/output controller 52, or outputs the received data to the serial register 22.

Therefore, when an RBA read mode is selected from the mode selector 34 in the RBA controller 30, data is controlled to be outputted from the input/output controller 52 to the input/output block 51. Also, the RBA-Y decoder 23 outputs the Y-address and a signal informing the RBA read mode to the RBA selector 21 and the serial register 22. The RBA selector 21 outputs to the memory cell array 40 the column address signal and the selection signal SELn informing the read mode.

When the memory cell array 40 sequentially outputs the corresponding block data, the serial register 22 sequentially receives the outputted data to thereby output the data in parallel to the input/output block 51. Then, the input/output block 51 outputs data read from the memory cell array 40.

Meanwhile, data applied to the input/output block 51 is sequentially transmitted to the serial register 22 and provided to the memory cell array 40 in parallel so as to be written therein.

However, adapting the conventional digital video processing circuit to a system such as a mobile communication (e.g. telephone) system to improve its operation speed has been difficult. In particular, it has been troublesome to apply such a big unit data access technique to the mobile telephone system, which prefers a format having the minimal size and weight. Thus, such drawbacks have made it difficult to improve throughput and data processing speed in a system such as a PCS (Personal Communication System).

SUMMARY OF THE INVENTION

Accordingly, the present invention is directed to a mobile communication system that substantially obviates one or more of the problems due to limitations and disadvantages of the related art.

An object of the present invention is to provide a mobile communication system which makes it possible to improve throughput rate and process mass data.

Another object of the present invention is to provide a mobile communication system which allows error correction of data having burst error.

A further object of the present invention is to provide a mobile communication system enabling a block size to be variable when carrying out a block unit read of data for applying to a system requiring a high speed process.

To achieve these and other advantages and in accordance with the purpose of the present invention, as embodied and broadly described, a receiver unit for a mobile communication system comprises a demodulator receiving an input signal, the input signal including interleaved data; an input/output unit coupled to the demodulator; a deinterleaver data array coupled to the input/output unit, the deinterleaver deinterleaving the interleaved data; an address generator coupled to the deinterleaver data array; a controller coupled to the input/output unit and the address generator, a memory unit coupled to the input/output unit; and a decoder coupled to the memory unit.

In another aspect of the present invention, a mobile communication system comprises a demodulator receiving and demodulating an interleaved data signal and outputting a demodulated interleaved data; a deinterleaver data array receiving and deinterleaving the demodulated interleaved data and outputting a deinterleaved demodulated data; a memory storing the deinterleaved demodulated data; a Viterbi decoder receiving the deinterleaved demodulated data from the memory, the Viterbi decoder correcting any error in the deinterleaved demodulated data; a controller accessing block unit data outputted from the demodulator to the deinterleaver data array and the memory, respectively; an address generator receiving an externally applied start address signal and outputting address signals corresponding to the block unit data to the deinterleaver data array; and an input/output unit coupled to the demodulator, the deinterleaver data array, and the controller, the input/output unit controlling data input/output operations.

In a further aspect, a mobile telephone system includes a demodulator for demodulating a data signal received at high frequency, a deinterleaver data array for receiving and deinterleaving the demodulator data, a Viterbi decoder unit RAM (random access memory) for transmitting to a Viterbi decoder for error correction the data demodulated in the demodulator and deinterleaved in the deinterleaver data array, a controller for accessing unit data outputted from the demodulator to the deinterleaver data array and the Viterbi decoder input RAM, respectively, an address generator for receiving an externally applied start address signal and outputting as many address signals as a block size to the deinterleaver data array; and an input/output unit for controlling data input/output operation.

The system employs a high speed data process algorithm for high speed process of a large amount of data so as to be applicable to a PCS (personal communication system) as well as a present mobile telephone system dealing with voice communication, and enables an asynchronous system to be operated in a partial synchronous method, thereby improving a system performance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A mobile telephone system of the present invention includes a demodulator for demodulating a data signal received at high frequency, a deinterleaver data array for receiving and deinterleaving the modulated data in accordance with an IS-95 standard. A Viterbi decoder input RAM (random access memory) transmits to a Viterbi decoder for error correcting the data demodulated in the demodulator and deinterleaved in the deinterleaver data array. A controller accesses a 32×8 bits of unit data outputted from the demodulator to the deinterleaver data array and the Viterbi decoder input RAM, respectively. An address generator receives an externally applied start address signal and outputs as many address signals as a block size to the deinterleaver data array. An input/output unit controls the data input/output operation.

The above deinterleaver operation is explained as follows. In conventional wireless communication, because data is transmitted digitally by radio frequencies through the air, the transmitted data may have burst errors due to noise, and error correction at the receiving end is not possible. To prevent such burst errors in the present invention, an interleaver is used at the transmission end, and a deinterleaver is used at the receiving end. For example, if the data sent from the interleaver is 1, 6, 11, 16, 2, 7, 12, 17, 3, 8, . . . and if errors occurred in data 2, 7 and 12, the received data would be 1, 6, 11, 16, x, x, x, 17, 3, 8, . . . thus resulting in a burst error. However, the deinterleaver restores the data as 1, x, 3, 4, 5, 6, x, 8, 9, 10, 11, x, 13, . . . which spreads out the burst error generated at the transmitting end and increases the possibilities of proper data restoration even the presence of noise.

Figure 1:
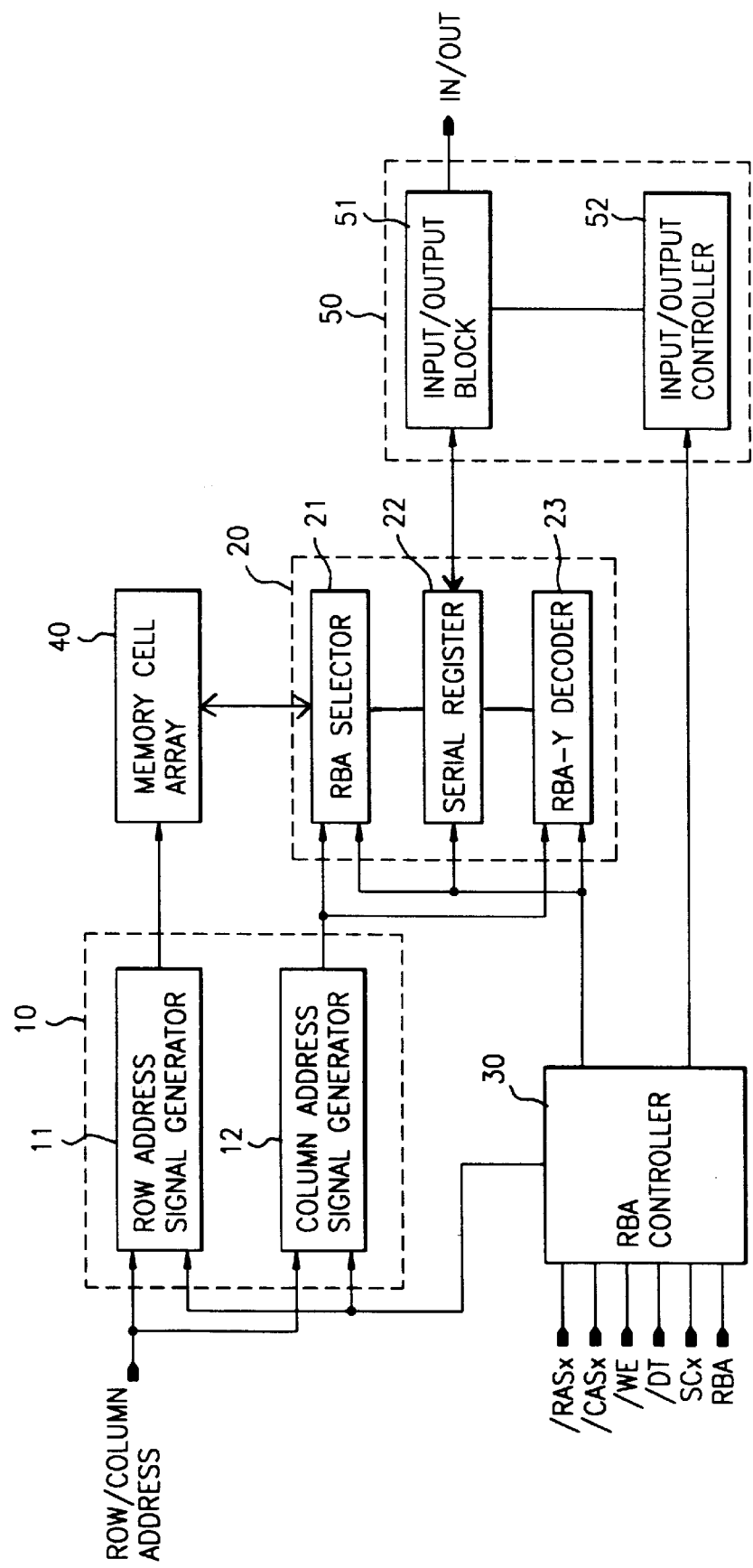
FIG. 1 is a block diagram of a conventional digital video processing circuit.
Figure 2:
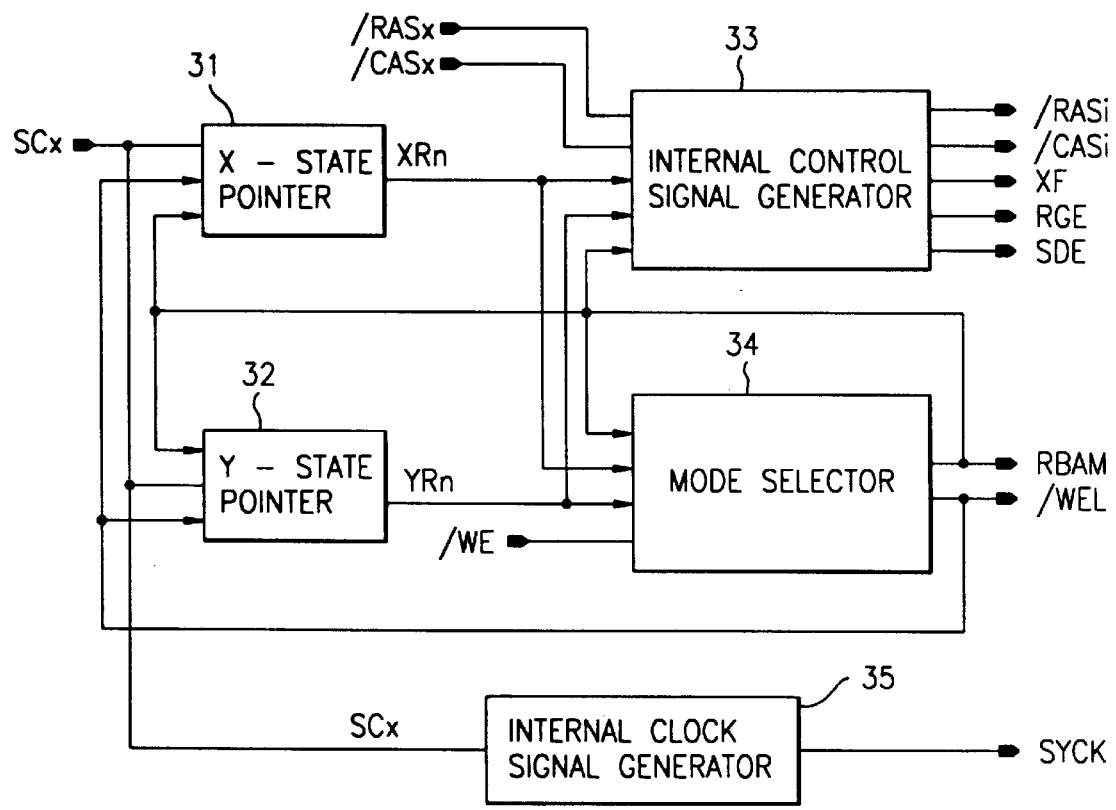
FIG. 2 is a detailed block diagram showing a random block access (RBA) controller in the circuit of FIG. 1.
Figure 3:
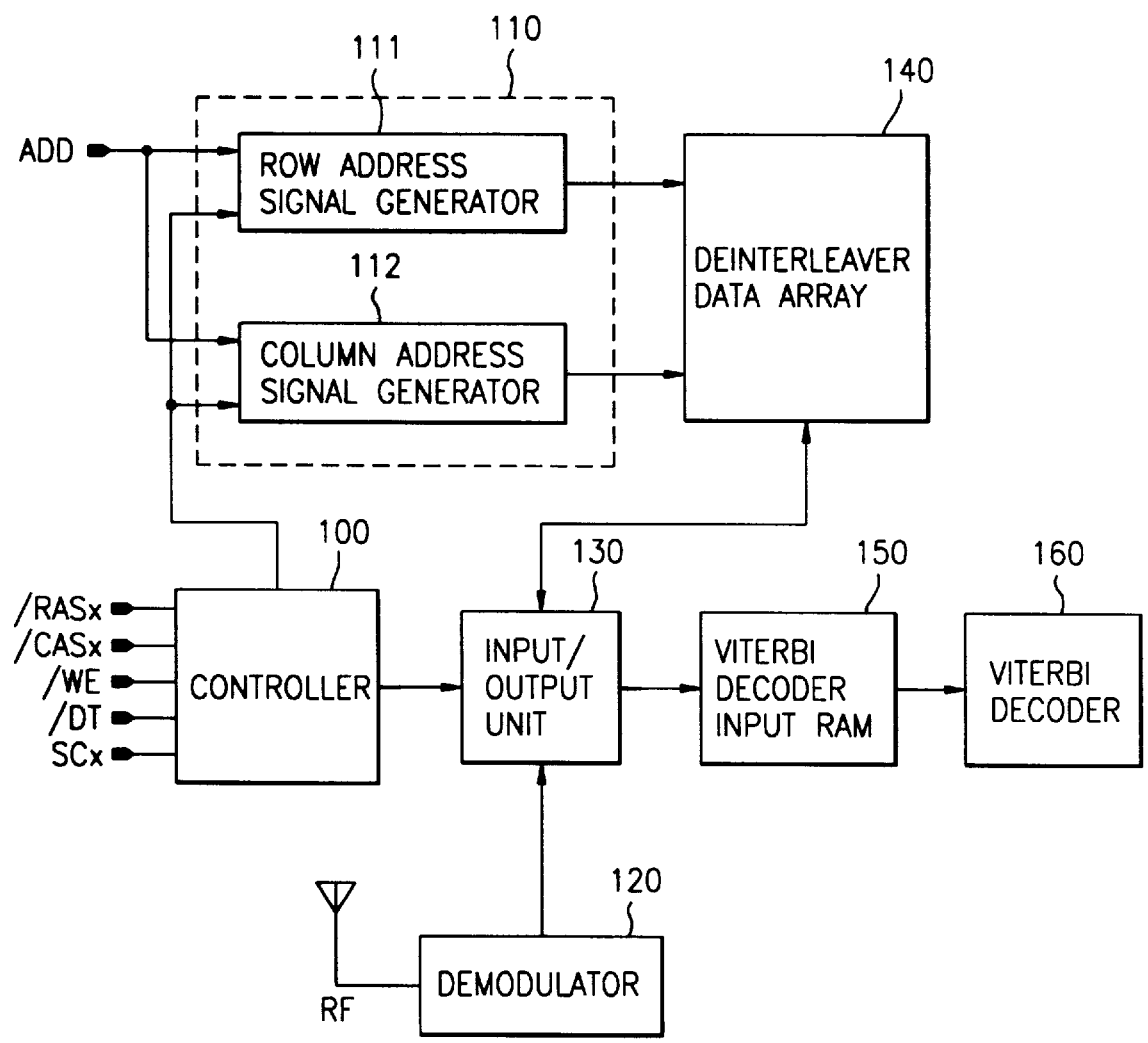
FIG. 3 is a block diagram showing a mobile telephone system according to the present invention.

As shown in FIG. 3, the mobile telephone system according to the present invention includes a demodulator 120 for demodulating a high frequency data signal. A deinterleaver data array 140 receives and deinterleaves the modulated data in accordance with an IS-95 standard. The IS-95 standard was established in 1995 for digital cellular and personal communication system (PCS) technologies. This standard applies to wireless mobile telecommunication systems employing commercial code division multiple access (CDMA) technology, and is the standard for digital cellular phone technology currently used in Korea. A Viterbi decoder input RAM 150 transmits to a Viterbi decoder 160 for error correction the data demodulated in the demodulator 120 and deinterleaved in the deinterleaver data array 140. A controller 100 enables the data output from the demodulator 120 to be accessed in 32×8 bits of unit data to the deinterleaver data array 140 and the Viterbi decoder input RAM 150. An address signal generator 110 receives a start address ADD from a central process unit and generates as many address signals as the number of blocks to the deinterleaver data array 140. An input/output unit 130 controls the data input/output operation.

Figure 4:
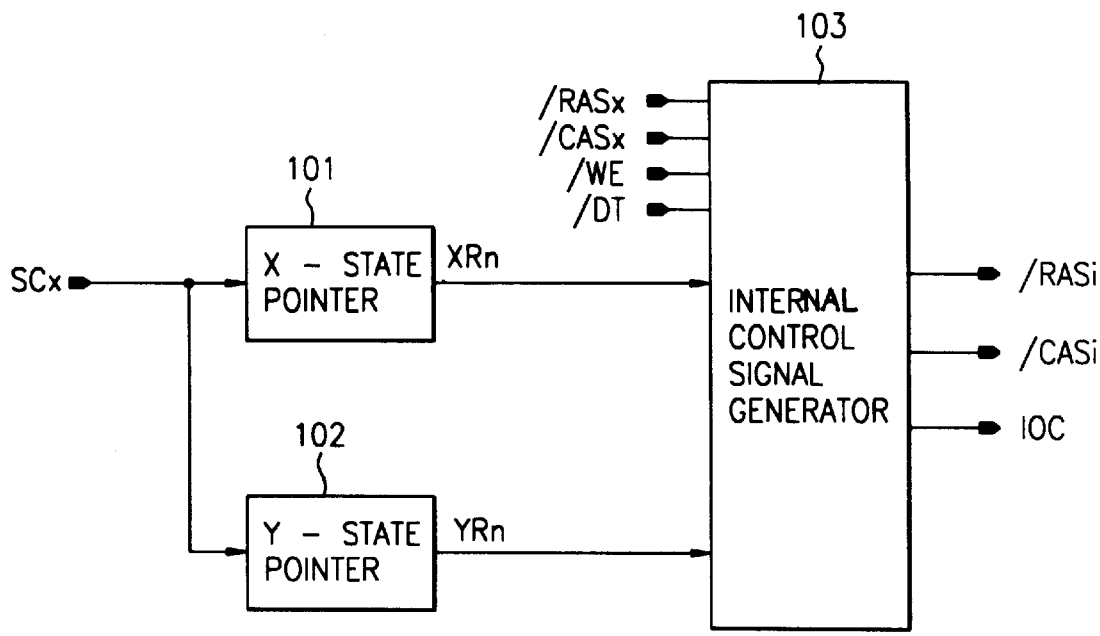
FIG. 4 is a detailed block diagram of a controller in the circuit of FIG. 3.

The address generator 110 includes a row address signal generator 111 for generating a row address signal being presently accessed thereto, where the externally applied serial clock signal SCx is increased by one per every 32 cycles and outputs the counted value YRn (FIG. 4). Referring to FIG. 4, an internal control signal generator 103 receives the output values XRn, YRn of the respective X-state and Y-state pointers 101, 102, an externally applied row address strobe signal /RASx, an externally applied column address strobe signal /CASx, a write enable signal /WE, and a data transmission signal /DT, and generates an internal row address strobe signal /RASi, an internal column address strobe signal /CASi, and an input/output control signal IOC.

The operation and effects of the mobile telephone system of the present invention will now be described.

A data signal received via a radio frequency RF antenna is demodulated in the demodulator 120. The demodulated data is outputted. The demodulated data, which is received as interleaved data so as to overcome a data burst error, is transmitted via the input/output unit 130 to the deinterleaver data array 140. The deinterleaver data array 140 receives and stores therein the deinterleaved and demodulated data after deinterleaving.

At this time, the demodulator 120 successively outputs data, and the data is written in a bit unit in the deinterleaver data array 140.

When one frame of data written in the deinterleaver data array 140 is stored, the deinterleaver data array 140 transmits the frame data through the input/output unit 130 to the Viterbi decoder input RAM 150 to thereby carry out an error data correction. Then, the Viterbi decoder input RAM 150 transmits the received data to the Viterbi decoder 160 so as to carry out a decoding operation for an error correction.

At this time, the controller 100 receives the externally applied row address strobe signal /RASx, the externally applied column address strobe signal /CASx, the write enable signal /WE, the data transmission signal /DT, and the serial clock signal SCx. The controller carries out in block units a read operation from the deinterleaver data array 140 and a write operation to the Viterbi decoder input RAM 150. That is, starting from an externally applied address signal ADD, the row address generator 111 and the column address generator 112 in the address generator 110 respectively generate a corresponding one of a row address signal and a column address signal, thereby carrying out a successive block size access such as 32×8 bits instead of addressing in each data access.

At this time, the X-state pointer 101 in the controller 100 counts a displacement value from 0 to 7 of a row address signal being presently accessed thereto, where an externally applied serial clock signal SCx is increased by one per cycle. The Y-state pointer 102 counts a displacement value from 0 to 31 of a column address signal being presently accessed thereto in a way in which the externally applied serial clock signal SCx is increased by one per 32 cycles. Thus, when one block (32×8 bits, for example) access has ended, another block (32×8 bits, for example) access is started. That is, the access value XRn, YRn of the respective X-state, Y-state pointers 101, 102, shown in FIG. 4, are output to the internal control signal generator 103. The internal control signal generator 103 employs the access values XRn, YRn, the externally applied row address strobe signal /RASx, the externally applied column address strobe signal /CASx, the write enable signal /WE, and the data transmission signal /DT, and generates the internal row address strobe signal /RASi, the internal column address strobe signal /CASi, and the input/output control signal IOC so as to control the row address generator 111, the column address generator 112, and the input/output unit 130.

Then, the row address generator 111 and the column address generator 112 respectively receive a new start address signal and successively transmit to the deinterleaver data array 140 a half block (32×8 bits) of the deinterleaver data array 140 (where a full block is 32×16). When the operation explained above is carried out twice, all the data in the deinterleaver data array 140 can be transmitted to the Viterbi decoder input RAM 150.

In accordance with a present well known IS-95 standard, the size of the deinterleaver data array 140 is 32×16 bits, and the Viterbi decoder 160 is synchronously operated and can be processed as described above. Moreover, in a system in which a large amount of data needs to be processed at a high speed, the block size can be varied and the corresponding amount of data processed accordingly.

Consequently, when the data processed on the demodulator 120 is successively outputted, the outputted data is written in the deinterleaver data array 140 in a bit block unit. When one frame of data is stored in the deinterleaver data array 140, a predetermined block size is read, such as 32×8 bits, and transmitted to the Viterbi decoder input RAM 150. Thus, according to such successive operations, write and read operations can be simultaneously carried out.

Figure 5A:
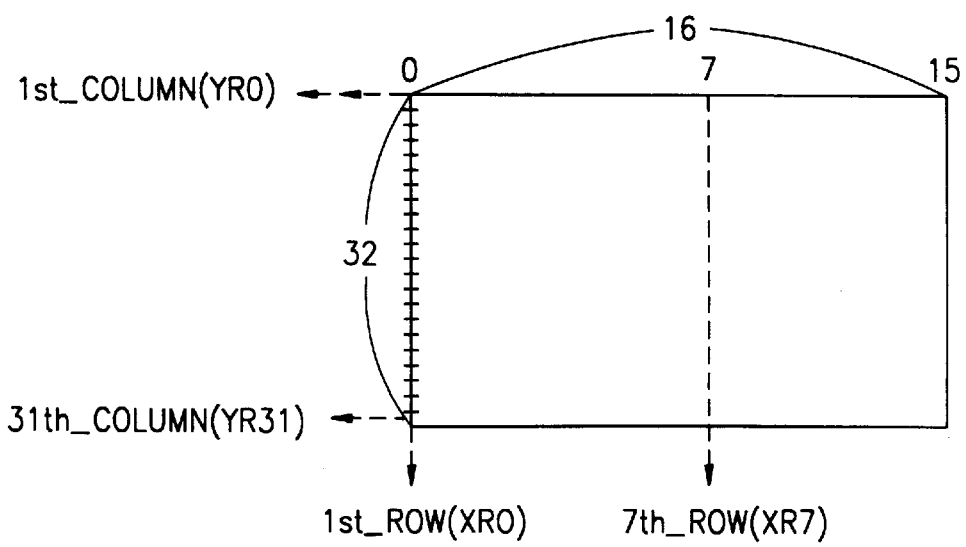
FIGS. 5A and 5B illustrate a 32×16 data block and timing diagrams of the signals in the circuit depicted in FIG. 3.
Figure 5B:
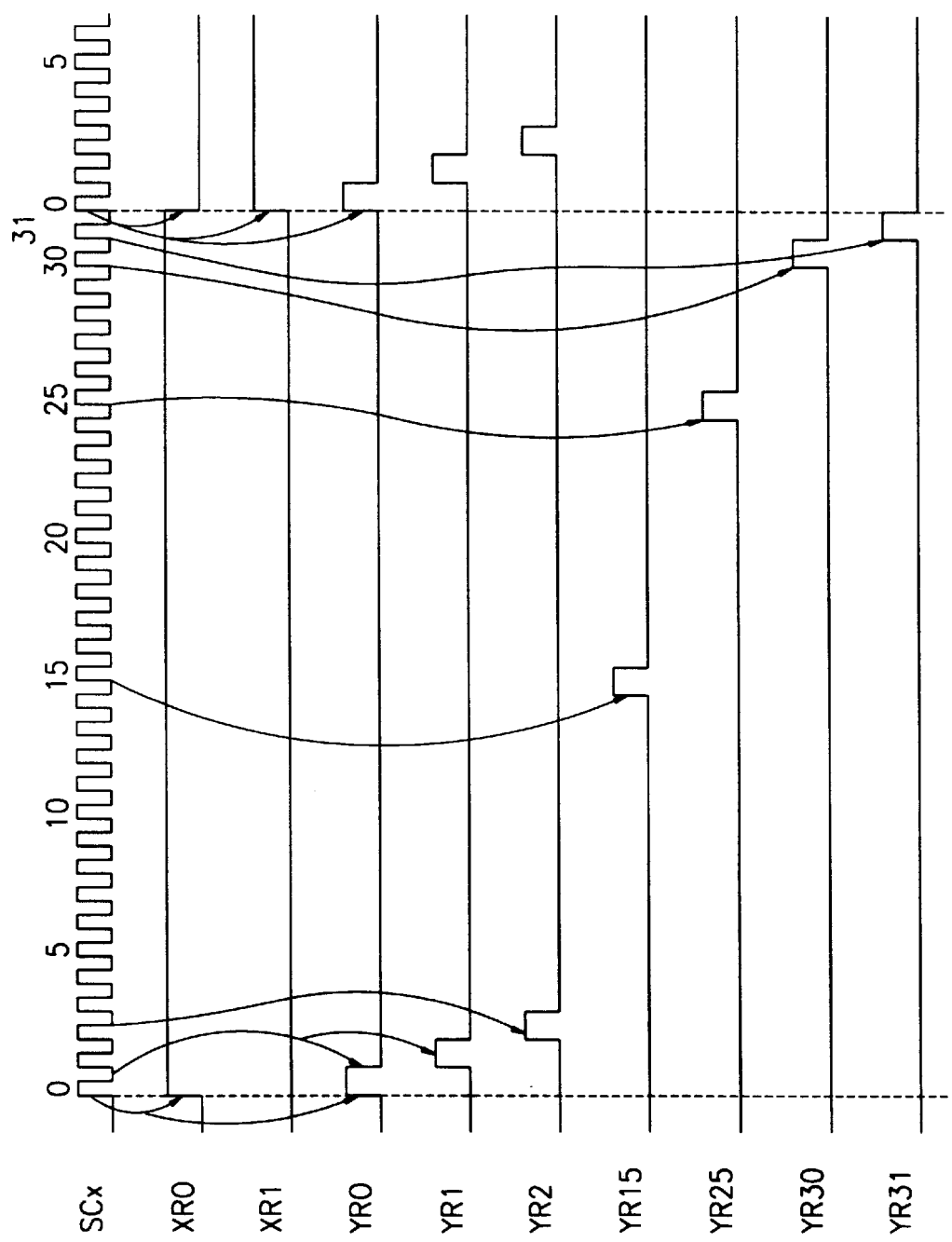

FIGS. 5A and 5B show a 32×16 data block and timing diagrams of the signals in the circuit depicted in FIG. 3. The generation of internal addresses and the operation of the X-state and Y-state pointers that indicate the current access states during system access operations will be explained with reference to FIGS. 5A and 5B.

The timing diagrams of FIG. 5B show the states of current access (read/write) of some of the rows (XR0–7) and columns (YR0–31), and are used as a time reference for internal control operations in accordance with data access states. The access of 1-bit data is completed within one cycle of the SCx clock signal. To continuously access the data positioned in the 1st_ROW, the XR0 signal (a row; a word-line in a DRAM) is maintained at a logic high for the duration of colums 0 to 31. The YR0–31 signals (a column; a bit-line in a DRAM) are toggled while data corresponding to one row is continuously accessed. In general, this occurs as a burst of access, but in the case of DRAM, this occurs in a fast page mode. After the 1st_ROW access is complete, accessing of the 2nd to 7th_ROWS takes place by accessing of data during the toggling of the 32-column signals for each row, as done in the case in the 1st ROW. Here, XRn indicates the logic high state in accordance with the access of the column data for a defined block size, while YRn indicates the toggling at every XRn for the defined size of 0 to 31 columns.

As described above, the mobile telephone system according to the present invention employs a high speed data process algorithm for high speed processing of a large amount of data so as to be applicable to a PCS (personal communication system) as well as current mobile telephones dealing with voice communication.

Further, the present invention enables an asynchronous system operation in a partial synchronous method, thereby improving system performance. According to the structure of the present invention described above, after data is written into the deinterleaver in accordance with a memory map, the data is transferred back to the Viterbi decoder input RAM 150 and then the Viterbi decoder 160 performs error correction. As the write and read operations are possible in block units, if writing to the deinterleaver is performed using the minimum data size required for the Viterbi decoder 160 to operate, the write operation can continuously take place by transferring the already written data to the Viterbi decoder input RAM 150 to operate the Viterbi decoder 160.

For example, data is written as a half-block. The half-block of written data is transferred to the Viterbi decoder input RAM 150 while new data is continuously being written. Decoding of the half-block of written data begins upon the completion of the writing of the half-block data. The new data is written as the Viterbi decoder operates. Thus, applications to data processing requiring continuous high speed operation can also be performed henceforth, since an asynchronous system can be operated in a partial synchronous method.

It will be apparent to those skilled in the art that various modifications and variations can be made in the mobile communication system of the present invention without departing from the spirit or scope of the invention. Thus, it is intended that the present invention cover the modifications and variations of this invention provided they come within the scope of the appended claims and their equivalents.

What is claimed is:

1. A receiver unit for a mobile communication system comprising:
    a demodulator receiving an input signal, the input signal including interleaved data;
    an input/output unit coupled to the demodulator;
    a deinterleaver data array coupled to the input/output unit, the deinterleaver data array deinterleaving the interleaved data;
    an address generator coupled to the deinterleaving data arrays;
    a controller coupled to the input/output unit and the address generator, wherein the controller comprises an internal control signal generator which receives a first signal and a second signal from an X-state pointer and a Y-state pointer, respectively, a write enable signal and a data transmission signal and outputs an internal row address strobe, an internal column address strobe, and an input/output control signal;
    a memory unit coupled to the input/output unit; and
    a decoder coupled to the memory unit.

2. The receiver unit according to claim 1, wherein the X-state pointer counts a value from 0 to m and the Y-state pointer counts a value from 0 to n, where m and n are integers.

3. The receiver unit according to claim 1, wherein the deinterleaver data array receives data from the input/output unit in block units and the block units are written in the deinterleaver data array.

4. The receiver unit according to claim 3, wherein each of the block units has a size that is a minimum data size required for the decoder.

5. The receiver unit according to claim 3, wherein a size of each of the block units is 32×8 bits.

6. The receiver unit according to claim 3, wherein a size of the block units can be varied.

7. The receiver unit according to claim 1, wherein the decoder includes a Viterbi decoder.

8. The receiver unit according to claim 7, wherein the memory unit includes a Viterbi decoder input RAM.

9. The receiver according to claim 1, wherein the address generator includes a row address generator and a column address generator.

10. The receiver unit according to claim 1, wherein the address generator generates as many address signals as a number of block units of data to the deinterleaver data array.

11. A receiver unit for a mobile communication system comprises:

a demodulator receiving and demodulating an interleaved data signal and outputting a demodulated interleaved data;

a deinterleaver data array receiving and deinterleaving the demodulated interleaved data and outputting a deinterleaved data;

a memory storing the deinterleaved data;

a Viterbi decoder receiving the deinterleaved data from the memory, the Viterbi decoder correcting any error in the deinterleaved data;

a controller accessing block unit data outputted from the demodulator to the deinterleaver data array and the memory, respectively; wherein the controller comprises an internal control signal generator which receives a first signal and a second signal from an X-state pointer and a Y-state pointer, respectively, a write enable signal and a data transmission signal and outputs and internal row address strobe, an internal column address strobe, and an input/output control signal;

an address generator receiving an externally applied start address signal and outputting address signals corresponding to the block unit data to the deinterleaver data array; and an input/output unit coupled to the demodulator, the deinterleaver data array, and the controller, the input/output unit controlling data input/output operations.

12. The mobile communication system according to claim 11, wherein the X-state pointer counts a value from 0 to m and the Y-state pointer counts a value from 0 to n, where m and n are integers.

13. The mobile communication system according to claim 11, wherein the deinterleaver data array receiver data from the input/output unit in block units and the block units are written in the deinterleaver data array.

14. The mobile communication system according to claim 11, wherein each of the block units has a size that is a minimum data size required for the Viterbi decoder.

15. The mobile communication system according to claim 11, wherein a size of each of the block units is 32×8 bits.

16. The mobile communication system according to claim 11, wherein a size of the block units can be varied.

17. The receiver unit according to claim 11, wherein the address generator includes a row address generator and a column address generator.

18. The receiver unit according to claim 11, wherein the address generator generates as many address signals as a number of block units of data to the deinterleaver data array.

19. A mobile receiver unit for a telephone system comprises:

a demodulator receiving and demodulating an interleaved data signal and outputting a demodulated interleaved data;

a deinterleaver data array receiving and deinterleaving the demodulated interleaved data and outputting a deinterleaved data;

a memory storing the deinterleaved data;

a Viterbi decoder receiving the deinterleaved data from the memory, the Viterbi decoder correcting any error in the deinterleaved data;

a controller accessing block unit data outputted from the demodulator to the deinterleaver data array and the memory, respectively, the controller including:

an X-state pointer outputting a first signal in response to a clock signal;

a Y-state pointer outputting a second signal in response to a clock signal; and an internal control signal generator coupled to the X-state and Y-state pointers and receiving a first and second signals, an external RAS, an external CAS, a write enable signal, and a data transmission signal, the internal control signal generator outputting an internal row address strobe, an internal column address strobe, and an input/output control signal;

an address generator receiving an externally applied start address signal and outputting address signal corresponding to the block unit data to the deinterleaver data array; and an input/output unit coupled to the demodulator, the deinterleaver data array, and the controller, the input/output unit controlling data input/output operations, the deinterleaver data array receiving data from the input/output unit in block units and the block units are written in the deinterleaver data array.

20. The mobile telephone system according to claim 19, wherein the X-state pointer counts a value from 0 to m and Y-state pointer counts a value from 0 to n, where m and n are integers.

21. The mobile telephone system according to claim 19, wherein each of the block units has a size that is a minimum data size required for the Viterbi decoder.

22. The mobile telephone system according to claim 19, wherein a size of each of the block units is 32×8 bits.

23. The mobile telephone system according to claim 19, wherein a size of the block units can be varied.

24. The mobile telephone system according to claim 19, wherein the address generator includes a row address generator and a column address generator.

25. The mobile telephone system according to claim 19, wherein the address generator generates as many address signals as a number of block units of data to the deinterleaver data array.

* * * * *

UNITED STATES PATENT AND TRADEMARK OFFICE
CERTIFICATE OF CORRECTION

PATENT NO. : 6,201,838 B1
DATED : March 13, 2001
INVENTOR(S) : Dae Sik Kim

Page 1 of 1

It is certified that error appears in the above-identified patent and that said Letters Patent is hereby corrected as shown below:

Column 8, claim 1,
Line 9, change "deinterleaving" to -- deinterleaver --.
Line 10, change "arrays" to -- array --.

Column 9, claim 11,
Line 20, change "and" to -- an --.

Column 10, claim 19,
Line 28, change "signal" to -- signals --.

Signed and Sealed this

Twelfth Day of March, 2002

Attest:

*Attesting Officer*

JAMES E. ROGAN
*Director of the United States Patent and Trademark Office*